United States Patent
Caprioli et al.

(10) Patent No.: US 7,716,457 B2
(45) Date of Patent: May 11, 2010

(54) METHOD AND APPARATUS FOR COUNTING INSTRUCTIONS DURING SPECULATIVE EXECUTION

(75) Inventors: Paul Caprioli, Santa Clara, CA (US); Shailender Chaudhry, San Francisco, CA (US); Sherman H. Yip, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 316 days.

(21) Appl. No.: 11/654,271

(22) Filed: Jan. 16, 2007

(65) Prior Publication Data

US 2008/0172549 A1    Jul. 17, 2008

(51) Int. Cl.
*G06F 9/00* (2006.01)
(52) U.S. Cl. ...................................................... 712/220
(58) Field of Classification Search .................. 712/220
See application file for complete search history.

(56) References Cited

U.S. PATENT DOCUMENTS

| 5,938,760 | A  | * | 8/1999 | Levine et al. ............... 712/220 |
| 6,675,372 | B1 | * | 1/2004 | Damron ...................... 717/130 |
| 2004/0024996 | A1 | * | 2/2004 | Le et al. ..................... 712/228 |
| 2006/0212688 | A1 | * | 9/2006 | Chaudhry et al. ........... 712/228 |

* cited by examiner

*Primary Examiner*—David J Huisman
*Assistant Examiner*—John Lindlof
(74) *Attorney, Agent, or Firm*—Park, Vaughan & Fleming LLP

(57) ABSTRACT

One embodiment of the present invention provides a system that counts speculatively-executed instructions for performance analysis purposes. During operation, the system counts instructions which are normally executed during a normal-execution mode. Next, the system enters a speculative-execution mode wherein instructions are speculatively executed without being committed to the architectural state of the processor. During the speculative-execution mode, the system counts the speculatively-executed instructions in a manner that enables the count of speculatively-executed instructions to be reset if the speculative execution fails.

15 Claims, 5 Drawing Sheets

METHOD AND APPARATUS FOR COUNTING INSTRUCTIONS DURING SPECULATIVE EXECUTION

BACKGROUND

1. Field of the Invention

The present relates to techniques for improving computer system performance. More specifically, the present invention relates to a method and an apparatus that facilitates counting instructions for performance analysis purposes during speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load generates a cache miss, the subsequent access to level-two (L2) cache or memory can require dozens or hundreds of clock cycles to complete, during which time the processor is typically stalled (and therefore idle), performing no useful work.

A number of forms of "speculative execution" have been proposed or are presently used to prevent the processor from stalling when a cache miss occurs. Some processors support "out-of-order execution," in which instructions are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers which are available for register renaming purposes during out-of-order execution also limits the effective size of the issue queue.

Some processor designers have proposed generating a checkpoint and entering a "scout mode" during processor stall conditions. In scout mode, instructions are speculatively executed to prefetch future loads, but results are not committed to the architectural state of the processor. For example, see U.S. patent application No. 10/741,944, filed 19 Dec. 2003, entitled, "Generating Prefetches by Speculatively Executing Code through Hardware Scout Threading," by inventors Shailender Chaudhry and Marc Tremblay. By avoiding the need to re-order instructions that were issued out-of-order, the scout mode technique avoids the need for complex instruction control structures. However, the scout mode technique suffers from the disadvantage of having to re-compute results of computational operations that were performed during scout mode.

To avoid performing some of these re-computations, processor designers have proposed entering an "execute-ahead" mode when the processor encounters a data-dependent stall condition. In execute-ahead mode, the processor defers instructions that cannot be executed because of unresolved data dependencies and executes other non-deferred instructions in program order.

When a data dependency is ultimately resolved, the processor transitions to a "deferred mode" to execute the deferred instructions. In deferred mode, the processor executes deferred instructions that are able to be executed while re-deferring deferred instructions that still cannot be executed because of unresolved data dependencies. For example, see U.S. Pat. No. 7,114,060, filed 14 Oct. 2003, entitled, "Selectively Deferring the Execution of Instructions with Unresolved Data Dependencies as They Are Issued in Program Order," by inventors Shailender Chaudhry and Marc Tremblay.

To achieve good performance, it is desirable to be able to measure the performance of processor designs that support the above-described speculative-execution techniques while executing real program code. These performance measurements can then be used to optimize system performance. For example, runtime compilers can use performance measurements to dynamically optimize code. Similarly, operating systems can use performance measurements to determine how processes interact, which allows the operating systems to efficiently schedule the processes to optimize interactions between processes.

Unfortunately, there presently exists no accurate way to measure processor performance during speculative execution. For example, instructions which are executed during execute-ahead mode do not actually perform useful work unless execute-ahead mode completes successfully. Hence, it is not clear whether instructions that are completed during execute-ahead mode should be added to the count of executed instructions.

When such performance measurements are inaccurate, users of the performance measurements, such as processor designers, programmers, operating systems, and compilers, use these inaccurate performance measurements to make design sub-optimal decisions which can lead to sub-optimal system performance.

Hence, what is needed is a method and an apparatus for evaluating the performance of a processor that supports speculative execution without the above-described problems.

SUMMARY

One embodiment of the present invention provides a system that counts speculatively-executed instructions for performance analysis purposes. During operation, the system counts instructions which are normally executed during a normal-execution mode. Next, the system enters a speculative-execution mode wherein instructions are speculatively executed without being committed to the architectural state of the processor. During the speculative-execution mode, the system counts the speculatively-executed instructions in a manner that enables the count of speculatively-executed instructions to be reset if the speculative execution fails.

In a variation on this embodiment, counting the instructions which are speculatively executed involves using a separate speculative-instruction counter to keep track of speculatively-executed instructions. In this variation, if the speculative execution completes successfully, the system commits results of the speculative execution to the architectural state of the processor, which involves adding the speculative-instruction counter to a normal instruction counter which is incremented during the normal execution mode.

In a variation on this embodiment, entering the speculative-execution mode involves checkpointing an instruction counter which is used to count instructions during a normal-execution mode. In this variation, counting the speculatively-executed instructions involves incrementing the same instruction counter for instructions that are speculatively executed. If the speculative execution fails, the system restores the instruction counter from the checkpoint.

In a variation on this embodiment, counting the instructions also involves counting cycles required to execute the instructions. This facilitates computing a cycles-per-instruction (CPI) value based on the counted instructions and the counted cycles.

In a variation on this embodiment, counting the instructions involves using one or more hardware counters to count the instructions.

In a variation on this embodiment, entering the speculative-execution mode involves generating a checkpoint before entering the speculative-execution mode.

In a variation on this embodiment, counting the instructions can involve counting: all instructions executed, non-privileged instructions executed, privileged instructions executed, memory operations performed, floating-point instructions executed, cache misses generated, and any other item which can be counted during instruction execution.

In a variation on this embodiment, the speculative-execution mode includes an execute-ahead mode, wherein instructions that cannot be executed because of an unresolved data dependency are deferred, and wherein other non-deferred instructions are executed in program order. It also includes a deferred mode wherein deferred instructions are executed in program order, and wherein deferred instructions that still cannot be executed because of unresolved data dependencies are deferred again.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Processor

Figure 1:
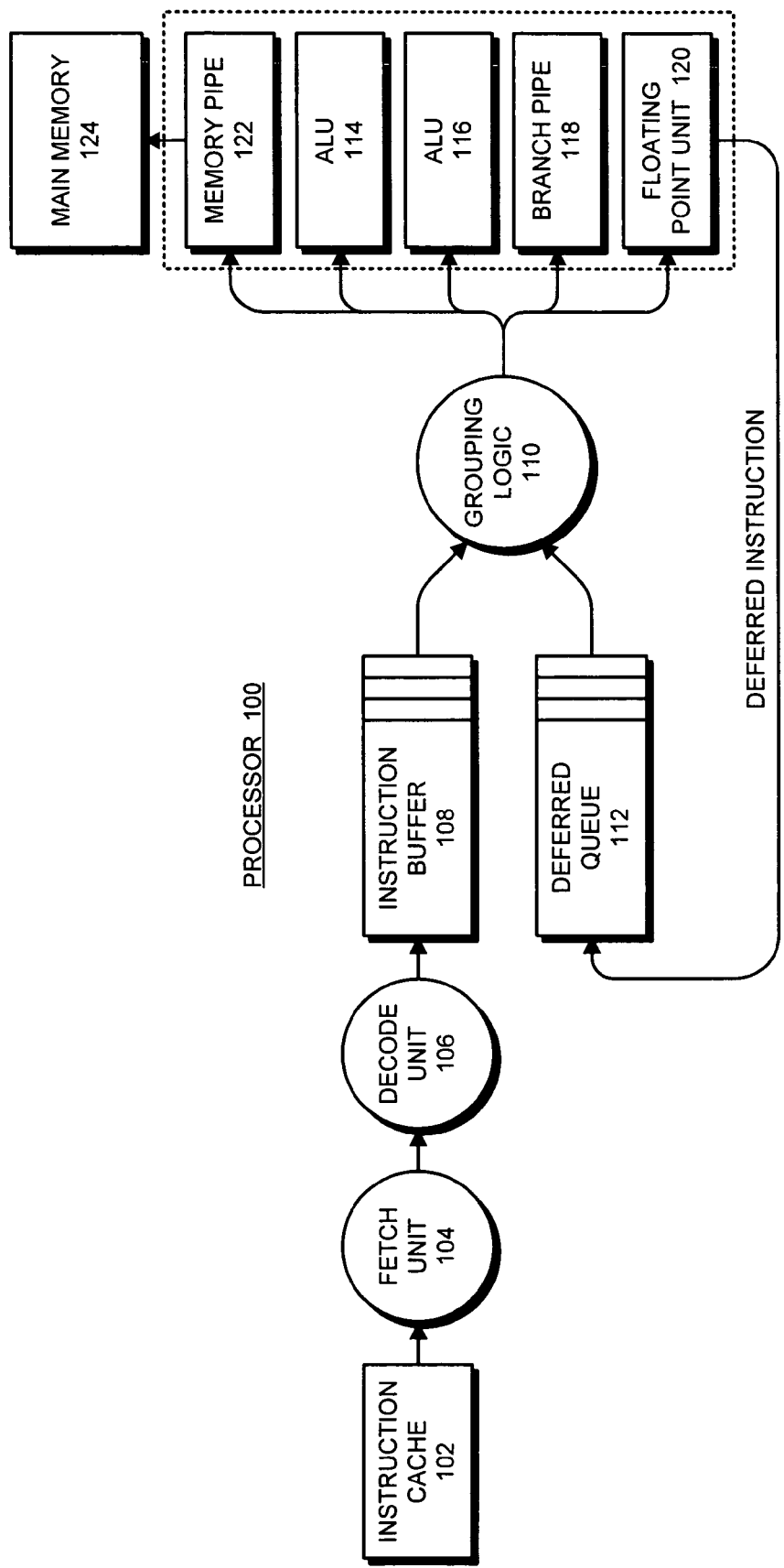
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120 and memory pipe 122.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 4.

Buffers

Figure 2:
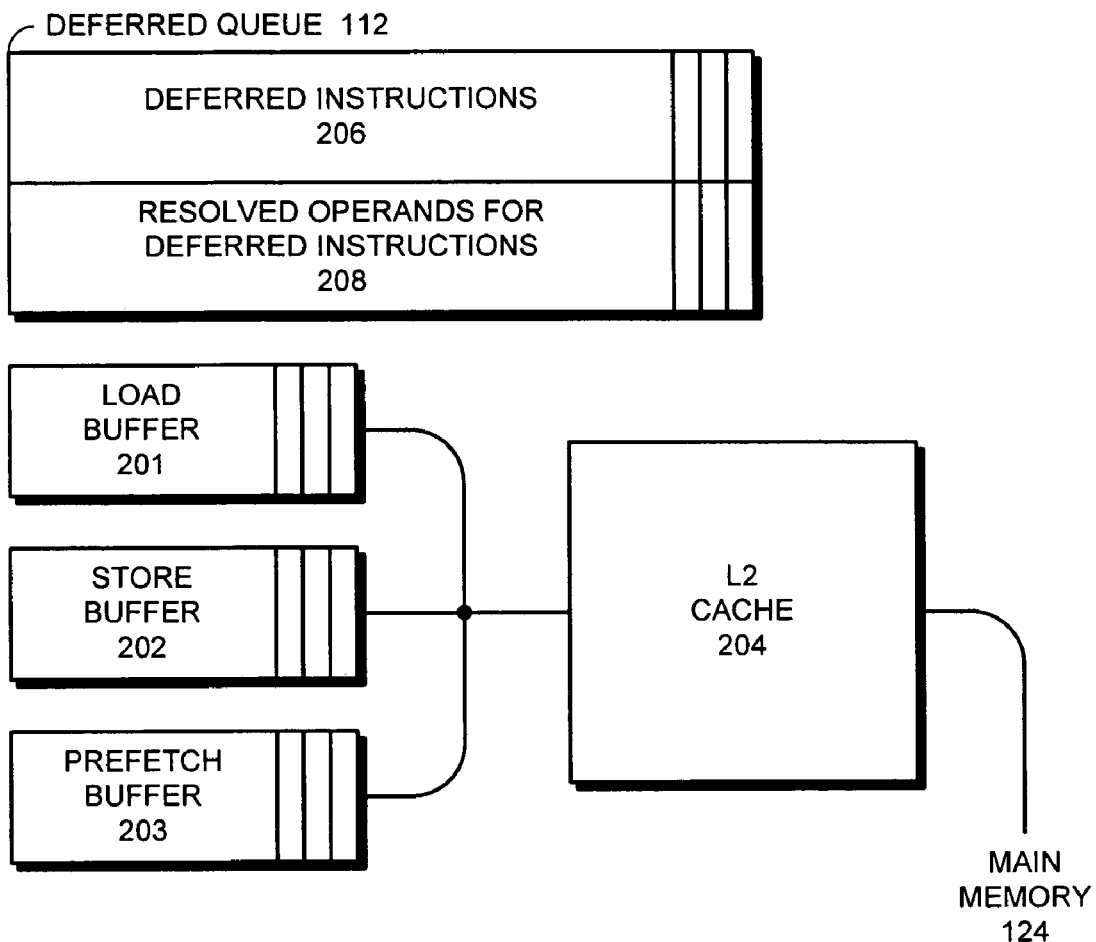
FIG. 2 illustrates various buffers within a processor in accordance with an embodiment of the present invention.

FIG. 2 illustrates various buffers and other structures within processor 100 in accordance with an embodiment of the present invention. These buffers and other structures include load buffer 201, store buffer 202, prefetch buffer 203 and L2 cache 204. All of these are well-known structures in existing processors. Load buffer 201, store buffer 202 and prefetch buffer 203 hold entries for load, store and prefetch instructions that are waiting to access slower portions of the memory hierarchy, such as L2 cache 204 and possibly main memory 124.

Also illustrated in FIG. 2 is deferred queue 112 (which also appears in FIG. 1). As was described above, deferred queue 112 stores deferred instructions 206, which are waiting for unresolved data dependencies to be resolved. In addition to storing deferred instructions, deferred queue 112 also stores corresponding operands 208 that have been resolved for the deferred instructions. When the deferred instructions 206 are finally executed in deferred mode, these deferred instructions 206 use the resolved source operands 208 from deferred queue 112, if such resolved operands were previously stored along with the instructions in the deferred queue 112. In this way, instructions following the deferred instructions that overwrite the resolved source operands will not create WAR hazards, because the deferred instructions will use the previously stored resolved operands 208 for the deferred instructions from deferred queue 112. This process is described in more detail below.

Keeping Track of Dependencies

The present invention keeps track of data dependencies in order to determine if an instruction is subject to an unresolved data dependency. In one embodiment of the present invention, this involves maintaining state information for each register, which indicates whether or not a value in the register depends on an unresolved data dependency.

Figure 3:
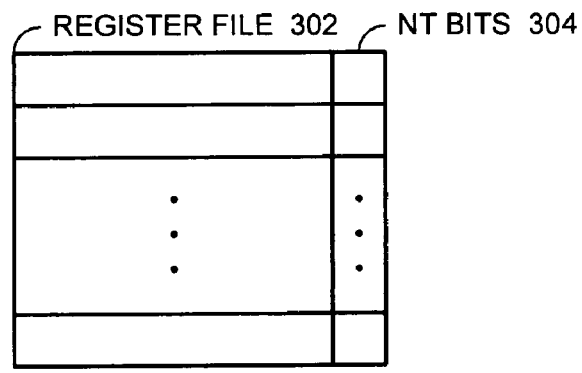
FIG. 3 illustrates a register file in accordance with an embodiment of the present invention.

For example, FIG. 3 illustrates a register file 302 in accordance with an embodiment of the present invention. Each register in register file 302 is associated with a "not-there" (NT) bit. During execute-ahead mode, the not-there bit keeps track of whether a valid operand value is contained in the register, or if the operand cannot be produced because of an unresolved data dependency. For example, if an instruction is waiting for a source operand to be produced by a load miss, the instruction is deferred and the not-there bit of the instruction's destination register is set to indicate that the desired result is not present in the destination register.

When a subsequent instruction references a source operand value that is marked as not-there, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 4:
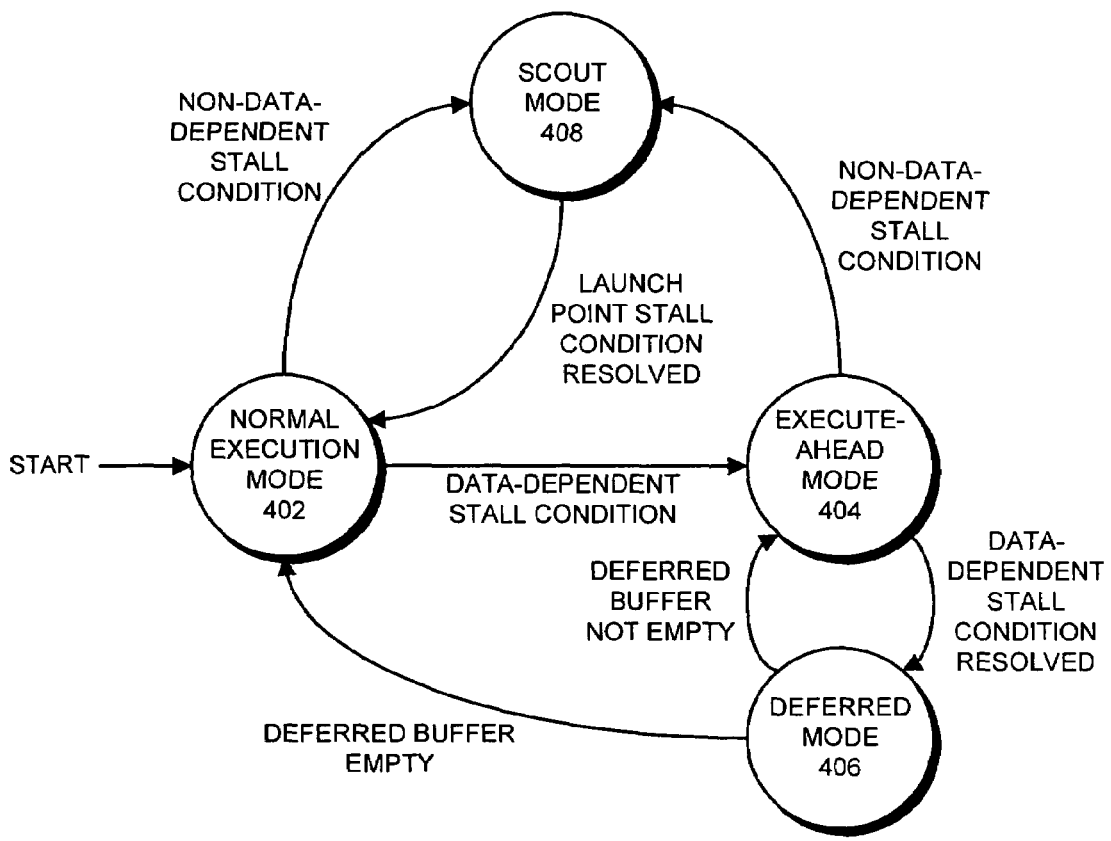
FIG. 4 presents a state diagram, which includes execute-ahead mode and scout mode, in accordance with an embodiment of the present invention.

FIG. 4 presents a state diagram which includes execute-ahead mode 404, deferred mode 406 and the scout mode 408 in accordance with an embodiment of the present invention. The system starts in normal-execution mode 402, wherein instructions are executed in program order as they are issued from instruction buffer 108 (see FIG. 1).

Next, if an unresolved data dependency arises during execution of an instruction, the system moves to execute-ahead mode 404. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 404, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 404 or deferred mode 406.) The system also "defers" execution of the instruction that encountered the unresolved data dependency by storing the instruction in deferred queue 112.

While operating in execute-ahead mode 404, the system continues to execute instructions in program order as they are received from instruction buffer 108; any instructions that cannot execute because of an unresolved data dependency are deferred into deferred queue 112.

During execute-ahead mode 404, if an unresolved data dependency is finally resolved, the system moves into deferred mode 406, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112. On the other hand, the system executes other instructions that can be executed in program order with respect to each other.

After the system completes a pass through deferred queue 112, if deferred queue 112 is empty, the system moves back into normal-execution mode 402. This may involve committing changes made during execute-ahead mode 404 and deferred mode 406 to the architectural state of processor 100, if such changes have not been already committed. It can also involve throwing away the checkpoint generated when the system moved into execute-ahead mode 404.

On the other hand, if deferred queue 112 is not empty after the system completes a pass through deferred queue 112, the system returns to execute-ahead mode 404 to execute instructions from instruction buffer 108 from the point where the execute-ahead mode 404 left off.

If a non-data dependent stall condition arises while the system is in normal-execution mode 402 or in execute-ahead mode 404, the system moves into scout mode 408. (This non-data-dependent stall condition can include a memory barrier operation, or a deferred queue full condition.) In scout mode 408, instructions are speculatively executed to prefetch future memory operations, but results are not committed to the architectural state of processor 100.

Scout mode 408 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 408.

Unfortunately, computational operations performed during scout mode 408 need to be recomputed again, which can require a large amount of computational work.

When the original "launch point" stall condition is finally resolved, the system moves back into normal-execution mode 402, and, in doing so, uses the previously generated checkpoint to resume execution from the launch point instruction that encountered the launch point stall condition. The launch point stall condition is the stall condition that originally caused the system to move out of normal-execution mode 402. For example, the launch point stall condition can be the data-dependent stall condition that caused the system to move from normal-execution mode 402 to execute-ahead mode 404, before moving to scout mode 408. Alternatively, the launch point stall condition can be the non-data-dependent stall condition that caused the system to move directly from normal-execution mode 402 to scout mode 408.

Using a Speculative-Instruction Counter to Count Instructions

Figure 5:
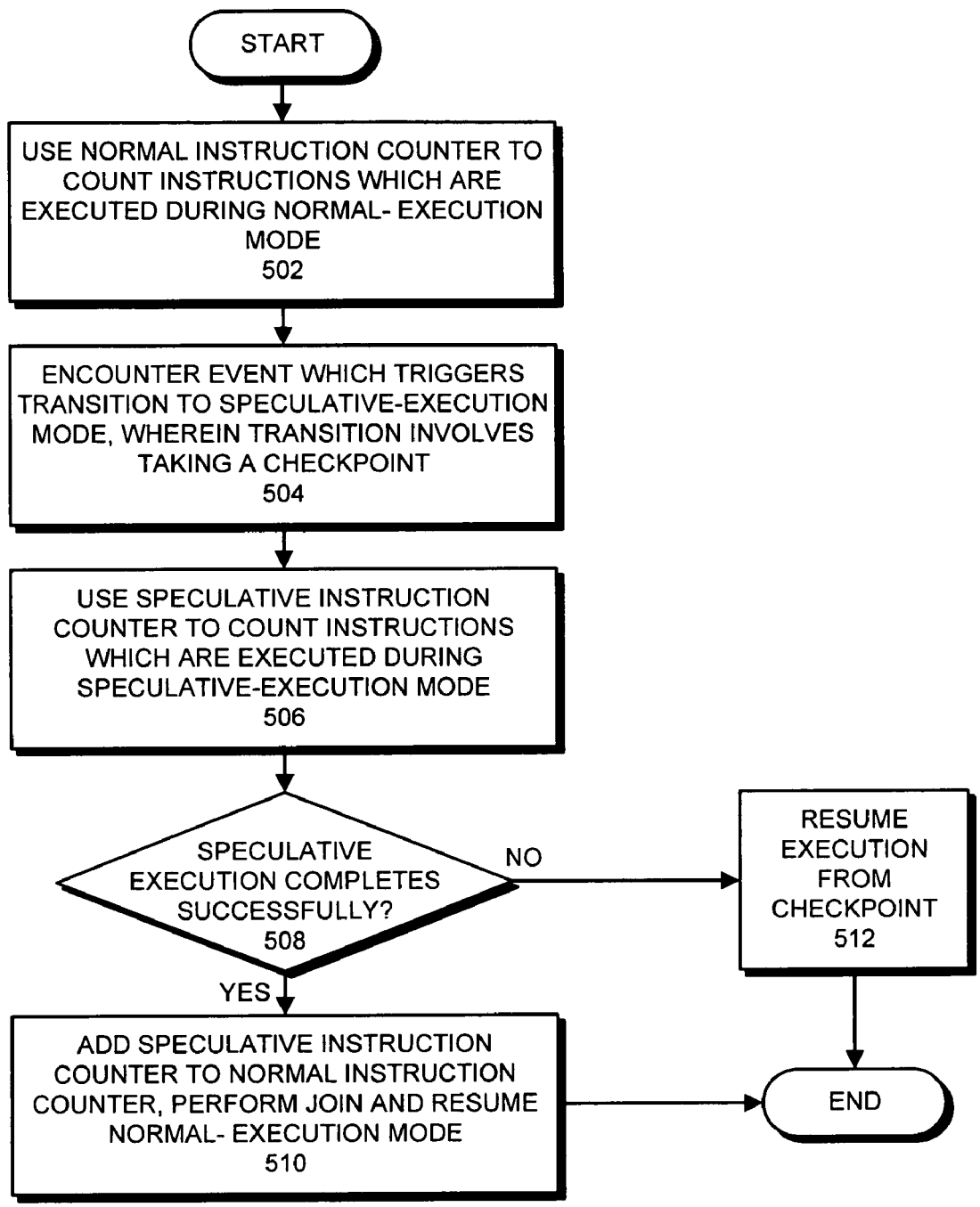
FIG. 5 presents a flow chart illustrating how instructions are counted during speculative execution in accordance with an embodiment of the present invention.
Figure 6:
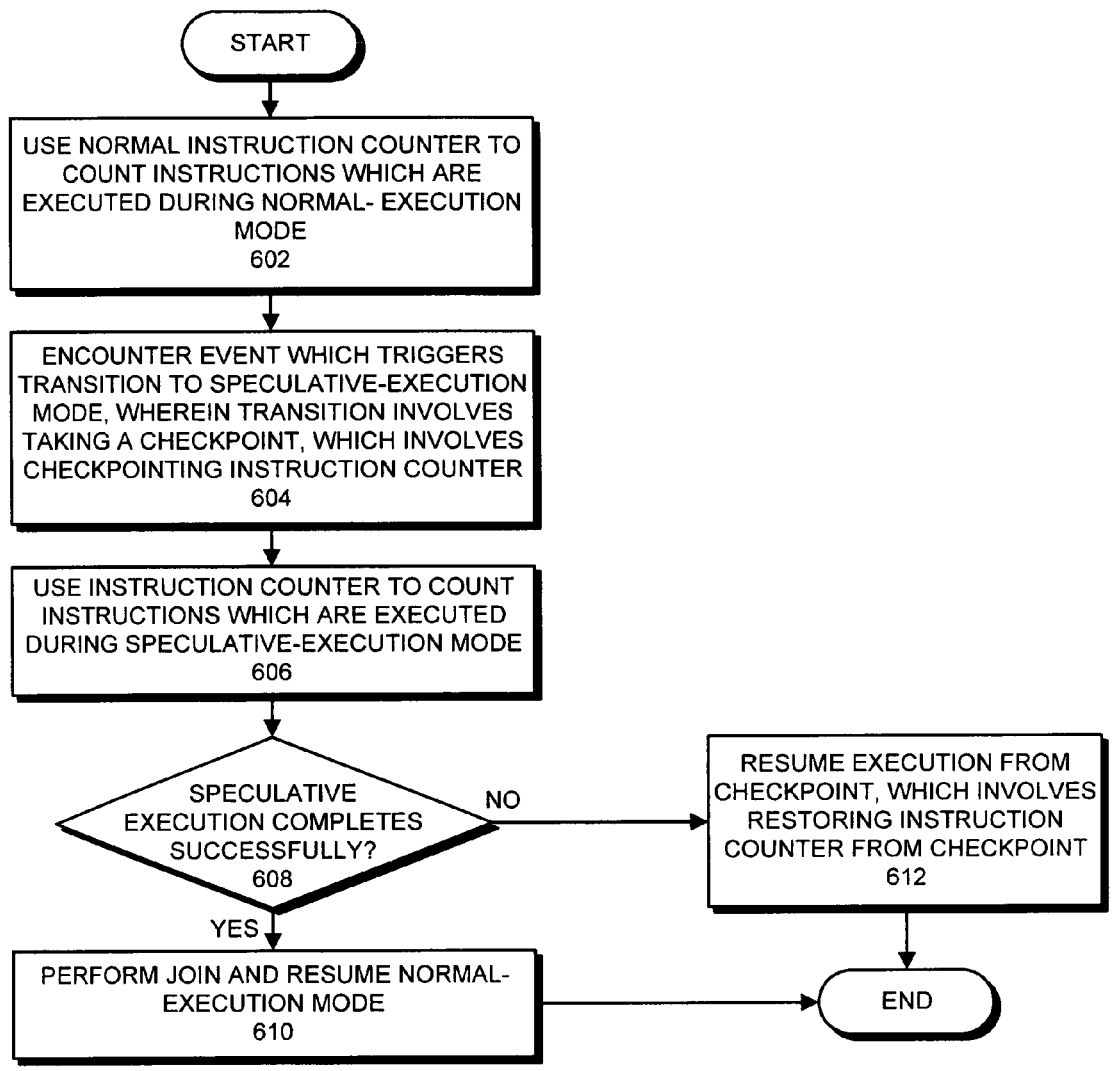
FIG. 6 presents a flow chart illustrating how instructions are counted during speculative execution in accordance with another embodiment of the present invention.

FIG. 5 presents a flow chart illustrating how instructions are counted during speculative execution in accordance with an embodiment of the present invention. In this embodiment, the instructions are counted using hardware counters, which are commonly found in processors and are used for performance measurement purposes.

In a variation on this embodiment, the system uses two instruction counters, one for normal execution and the other for speculative execution. More specifically, during normal-execution mode, the system uses a "normal instruction counter" to count instructions which are executed as the instructions are retired (step 502). Next, the system encounters an event which triggers a transition to speculative-execution mode, wherein the transition involves taking a checkpoint (step 504). For example, the system can encounter a data-dependent stall condition which causes the processor to enter execute-ahead mode.

During the speculative-execution mode, the system uses a "speculative instruction counter" to count instructions that are speculatively executed (step 506). This involves counting instructions which are executed during execute-ahead mode and deferred mode. (Instructions which are executed in scout mode can be ignored because they will eventually have to be re-executed.)

In one embodiment of the present invention, the system counts instructions as they are encountered in execute-ahead mode, even if the instructions are immediately deferred to be subsequently executed in deferred mode. To avoid counting instructions twice, the system does not count instructions when the instructions are eventually executed in the deferred mode because the instructions were previously counted as they were first deferred during execute-ahead mode.

In an alternative embodiment, instructions are counted as they are retired in either execute-ahead more or deferred mode (not when they are first encountered in execute-ahead mode).

Note that the system can count different types of instructions as well as events that occur during instruction execution. For example, the system can count: all instructions executed, non-privileged instructions executed, privileged instructions executed, memory operations performed, floating-point instructions executed, cache misses generated, and any other item which can be counted during instruction execution.

Next, the system determines whether the speculative execution completes successfully, which means that the all instructions in the deferred queue are successfully executed (step 508).

If so, the system performs a join operation, which involves (among other things) adding the speculative instruction counter to the normal instruction counter and resuming normal, non-speculative execution (step 510).

On the other hand, if the speculative execution does not complete successfully (for example, if the deferred queue overflows) the system resumes execution from the checkpoint and the normal instruction counter is not updated (step 512).

Using a Checkpointed Counter to Count Speculative Instructions

Another embodiment of the present invention uses the same instruction counter, which is checkpointed (instead of two separate instruction counters) to count instructions during normal-execution mode and speculative-execution mode. More specifically, during normal-execution mode, the system uses the instruction counter to count instructions which are executed as the instructions are retired. (step 602). Next, the system encounters an event which triggers a transition to a speculative-execution mode, wherein the transition involves taking a checkpoint. During this checkpointing process, the system checkpoints the instruction counter as well (step 604).

While executing in speculative-execution mode, the system uses the same counter to count instructions that are speculatively executed (step 606).

Next, the system determines whether the speculative execution completes successfully (step 608). If so, the system performs a join operation and resumes normal, non-speculative execution (step 610).

On the other hand, if the speculative execution does not complete successfully the system resumes execution from the checkpoint, which involves restoring the old value of the instruction counter from the checkpoint (step 612).

Note that although the present invention is described in the context of a system that supports execute-ahead mode and deferred mode, the present invention is not meant to be limited to such a system. In general, the present invention can be applied to systems that perform any type of speculative execution, and is not meant to be limited to systems that support execute-ahead mode and deferred mode.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for counting speculatively-executed instructions for performance analysis purposes, comprising:
   counting instructions which are normally executed during a normal-execution mode on a processor, wherein counting instructions involves incrementing an instruction counter when an instruction is executed during the normal-execution mode;
   entering a speculative-execution mode wherein instructions are speculatively executed without being committed to the architectural state of the processor, wherein the speculative-execution mode includes:
      an execute-ahead mode, wherein instructions that cannot be executed because of an unresolved data dependency are deferred, and wherein other non-deferred instructions are executed in program order; and
      a deferred mode wherein deferred instructions are executed in program order, and wherein deferred instructions that still cannot be executed because of unresolved data dependencies are deferred again;
   checkpointing a value of the instruction counter;
   counting the speculatively-executed instructions during the speculative-execution mode, wherein counting the speculatively-executed instructions involves incrementing the instruction counter as an instruction is encountered during the execute-ahead mode even if the instruction is deferred, and not counting any deferred instructions when the deferred instructions are executed in deferred mode; and
   if the speculative-execution mode does not complete successfully, restoring the value of the instruction counter from the checkpoint.

2. The method of claim 1,
   wherein if the speculative-execution mode completes successfully, the method further comprises committing results of the speculative execution to the architectural state of the processor.

3. The method of claim 1,
   wherein at least one of counting the instructions which are normally executed during the normal-execution mode and counting the speculatively-executed instructions also involves counting cycles required to execute the instructions; and
   wherein the method further comprises computing a cycles per instruction (CPI) value based on the counted cycles and at least one of the counted instructions which are normally executed during the normal-execution mode and the counted speculatively-executed instructions.

4. The method of claim 1, wherein at least one of counting the instructions which are normally executed during the normal-execution mode and counting the speculatively-executed instructions involves using one or more hardware counters to count the instructions.

5. The method of claim 1, wherein checkpointing the value of the instruction counter involves generating a checkpoint that includes the value of the instruction counter before entering the speculative-execution mode.

6. The method of claim 1, wherein at least one of counting the instructions which are normally executed during the normal-execution mode and counting the speculatively-executed instructions involves counting one or more of the following:
   all instructions executed;
   non-privileged instructions executed;
   privileged instructions executed;
   memory operations performed;
   floating-point instructions executed;
   cache misses generated;
   instructions of a given type; and
   events that occur during instruction execution.

7. An apparatus that counts speculatively-executed instructions for performance analysis purposes, comprising:
   a processor;
   wherein the processor is configured to count instructions which are normally executed during a normal-execution mode on a processor, wherein counting instructions involves incrementing an instruction counter when an instruction is executed during the normal-execution mode;
   wherein the processor is configured to enter a speculative-execution mode wherein instructions are speculatively executed without being committed to the architectural state of the processor, wherein the speculative-execution mode includes:
      an execute-ahead mode, wherein instructions that cannot be executed because of an unresolved data dependency are deferred, and wherein other non-deferred instructions are executed in program order; and
      a deferred mode wherein deferred instructions are executed in program order, and wherein deferred instructions that still cannot be executed because of unresolved data dependencies are deferred again;
   wherein the processor is configured to checkpoint a value of the instruction counter;
   wherein the processor is configured to count the speculatively-executed instructions during the speculative-execution mode, wherein counting the speculatively-executed instructions involves incrementing the instruction counter as an instruction is encountered during the execute-ahead mode even if the instruction is deferred, and not counting any deferred instructions when the deferred instructions are executed in deferred mode; and
   wherein if the speculative-execution mode does not complete successfully, the processor is configured to restore the value of the instruction counter from the checkpoint.

8. The apparatus of claim 7,
   wherein if the speculative execution completes successfully, the processor is configured to commit results of the speculative execution to the architectural state of the processor.

9. The apparatus of claim 7,
   wherein at least one of counting the instructions which are normally executed during the normal-execution mode and counting the speculatively-executed instructions also involves counting cycles required to execute the instructions; and
   wherein the processor is configured to compute a cycles per instruction (CPI) value based on the counted instructions and the counted cycles.

10. The apparatus of claim 7, wherein the processor includes one or more hardware counters to count at least one of the instructions which are normally executed during the normal-execution mode and the speculatively-executed instructions.

11. The apparatus of claim 7, wherein the processor is configured to generate a checkpoint that includes the value of the instruction counter before entering the speculative-execution mode.

12. The apparatus of claim 7, wherein at least one of the instructions which are normally executed during the normal-execution mode which are counted and the speculatively-executed instructions which are counted can include one or more of the following:
   all instructions executed;
   non-privileged instructions executed;
   privileged instructions executed;
   memory operations performed;
   floating-point instructions executed;
   cache misses generated;
   instructions of a given type; and
   events that occur during instruction execution.

13. A computer system that counts speculatively-executed instructions for performance analysis purposes, comprising:
   a processor; and
   a memory;
   wherein the processor is configured to count instructions which are normally executed during a normal-execution mode on the processor, wherein counting instructions involves incrementing an instruction counter when an instruction is executed during the normal-execution mode;
   wherein the processor is configured to enter a speculative-execution mode wherein instructions are speculatively executed without being committed to the architectural state of the processor, wherein the speculative-execution mode includes:
      an execute-ahead mode, wherein instructions that cannot be executed because of an unresolved data dependency are deferred, and wherein other non-deferred instructions are executed in program order; and
      a deferred mode wherein deferred instructions are executed in program order, and wherein deferred instructions that still cannot be executed because of unresolved data dependencies are deferred again;
   wherein the processor is configured to checkpoint a value of the instruction counter;
   wherein the processor is configured to count the speculatively-executed instructions during the speculative-execution mode, wherein counting the speculatively-executed instructions involves incrementing the instruction counter as an instruction is encountered during the execute-ahead mode even if the instruction is deferred, and not counting any deferred instructions when the deferred instructions are executed in deferred mode; and
   wherein if the speculative-execution mode does not complete successfully, the processor is configured to restore the value of the instruction counter from the checkpoint.

14. The computer system of claim 13,
   wherein if the speculative execution completes successfully, the processor is configured to commit results of the speculative execution to the architectural state of the processor.

15. The computer system of claim 13, wherein at least one of the instructions which are normally executed during the normal-execution mode which are counted and the speculatively-executed instructions which are counted can include one or more of the following:

all instructions executed;
non-privileged instructions executed;
privileged instructions executed;
memory operations performed;
floating-point instructions executed;
cache misses generated;
instructions of a given type; and
events that occur during instruction execution.

* * * * *

UNITED STATES PATENT AND TRADEMARK OFFICE
CERTIFICATE OF CORRECTION

PATENT NO.       : 7,716,457 B2
APPLICATION NO.  : 11/654271
DATED            : May 11, 2010
INVENTOR(S)      : Paul Caprioli et al.

It is certified that error appears in the above-identified patent and that said Letters Patent is hereby corrected as shown below:

In column 8, line 53, in claim 2, delete "speculative execution" and insert -- speculative-execution mode --, therefor.

In column 9, line 58, in claim 8, delete "speculative execution" and insert -- speculative-execution mode --, therefor.

In column 9, line 60, in claim 8, delete "speculative execution" and insert -- speculative-execution mode --, therefor.

In column 10, line 64, in claim 14, delete "speculative execution" and insert -- speculative-execution mode --, therefor.

In column 10, line 66, in claim 14, delete "speculative execution" and insert -- speculative-execution mode --, therefor.

Signed and Sealed this
Fourteenth Day of June, 2011

David J. Kappos
*Director of the United States Patent and Trademark Office*